Oct. 17, 1933.    W. S. COCHRANE    1,931,060
LUBRICATION SYSTEM
Filed March 5, 1928

INVENTOR
WALTER S. COCHRANE.
BY
ATTORNEY

Patented Oct. 17, 1933

1,931,060

UNITED STATES PATENT OFFICE 1,931,060

LUBRICATION SYSTEM

Walter S. Cochrane, Detroit, Mich., assignor to Chrysler Corporation, Detroit, Mich., a corporation of Delaware Application March 5, 1928. Serial No. 259,196

5 Claims. (Cl. 184—6)

My invention relates to lubrication systems for internal combustion engines of the type used in automotive vehicles and consists in a system for supplying lubricant to the cylinder walls of the engine during its warming-up period.

Heretofore lubrication systems have been provided in which manually controlled means has been provided to control the flow of lubricant to the cylinder walls and auxiliary systems have been provided for supplying lubricant to the cylinder walls. It is therefore an object of this invention to provide automatic means for supplying lubricant to the cylinder wall which applies a predetermined amount of lubricant during its warming-up period and is automatically shut off after the engine has run for a short time.

Another object of the invention is to embody the automatic means in the lubricating system.

As an example of a particular embodiment of my invention I have shown a means such as a reciprocating piston adapted to force a predetermined amount of lubricant to the cylinder walls, operated by the lubricant pressure from the pump.

Other objects and advantages will more fully appear from the following description taken in connection with the accompanying drawing, in which.

Figure 1:
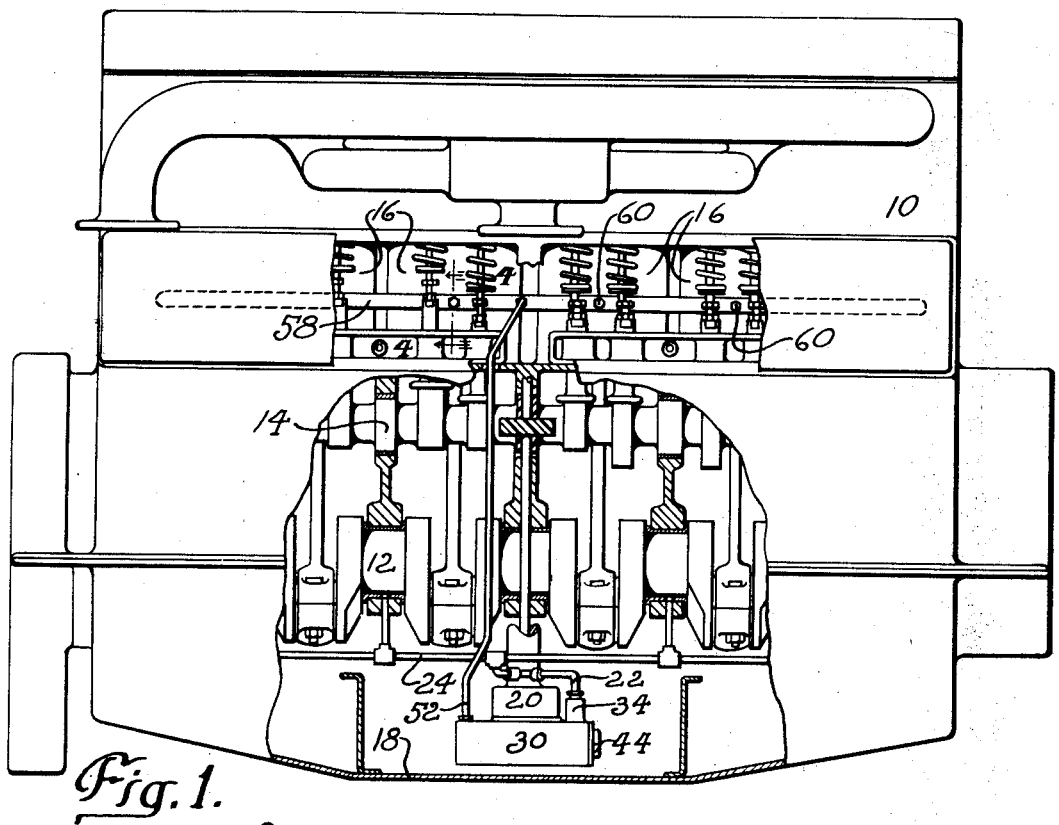
Fig. 1 is a side view of an internal combustion engine, parts being broken away and in section showing an application of my invention.

Referring particularly to Fig. 1 of the drawing, I have shown an internal combustion engine 10 provided with a crankshaft 12, camshaft 14 and cylinders 16. An oil pan has been shown as at 18 adapted to receive a quantity of lubricant and a pump 20 is adapted to deliver lubricant to the various parts of the engine, for example, the bearings of the crankshaft 12 and cam shaft 14.

The pump 20 is of usual design and is provided with a branched outlet having passages 22 and 24. The passage 24 is adapted to deliver lubricant to the various bearings of the engine.

It will be understood that after the engine has been standing, particularly in cold weather, the lubricant is viscous and the bearings are cold. The engine must be run for some time before the bearings become warm enough to permit the lubricant to go through the bearings to be thrown on the cylinder walls. Due to this and the viscosity of the lubricant the cylinder walls run dry during the warming up period of the engine. As a means of avoiding this objectionable feature I have provided a chamber 30 adapted to receive a predetermined amount of lubricant through the passage 22 which delivers lubricant under pressure directly to the cylinder walls.

Figure 2:
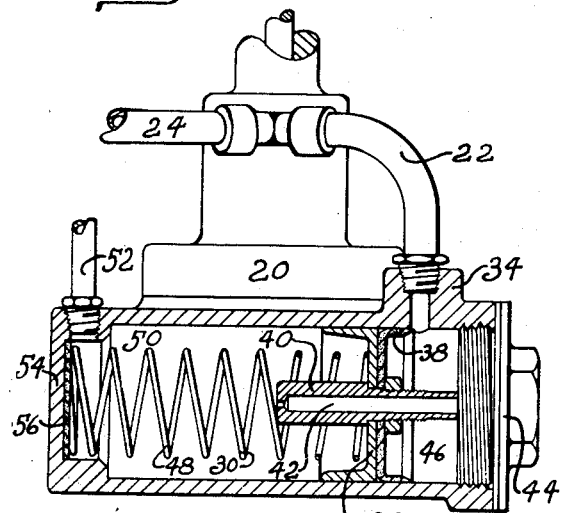
Fig. 2 is a sectional view through the automatic lubricant supplying means.

Referring now to Fig. 2 wherein the chamber 30 is more clearly shown, a piston 32 is adapted for reciprocation within the chamber 30. The wall of the chamber 30 has been shown integral with the oil pump 20 and is provided with a boss 34 adapted to receive the passage 22 leading into the chamber 30 at one side of the piston 32. The piston 32 is provided with the usual packing 38 and has a member 40 extending axially through the piston and beyond its opposite sides. The member 40 has an opening 42 through which lubricant may pass from one side of the piston to the other. A screw-threaded plug 44 closes one end of the chamber 30 and limits the movement of the piston 32 in one direction by the engagement of one end of the member 40 against the plug 44 thus providing a compartment 46 to which the lubricant is supplied. Between the opposite end of the chamber 30 and the opposite side of the piston 32 a spring 48 normally holds the piston in the position shown on the drawing.

When the engine is started the pump 20 forces the lubricant through the passage 22 into the compartment 46 where the pressure causes the piston to move to the left, displacing the lubricant in the compartment 50 through a connection 52 to the cylinder walls. When the end of the member 40 engages the end 54 of the chamber 30, the lubricant ceases to flow through the connection 52 and the piston remains in that position as long as there is any pressure on the opposite side of the piston, or during the running of the engine. When the engine is stopped, the pressure in the compartment 46 is relieved and the spring 48 returns the piston 32 to its normal position, the chamber 50 being refilled through the passage 42. If desired, a washer 56 may be provided to seal the end of the member 40 to further prevent lubricant from passing through the opening 42 when the piston 32 is in its position at the extreme left. It will be understood that the pump acts as a sufficient check to prevent the lubricant from returning through the passage 22 while the piston 32 is being returned.

The opposite end of the connection 52 communicates with a header 58 connected to each of the cylinder walls 16. The header 58 comprises a tubular member secured to the cylinder walls by bolts 60 tapped into the cylinder walls and having openings 62 and 64 through which the lubricant passes from the header 58 on to the cylinder walls.

Figure 3:
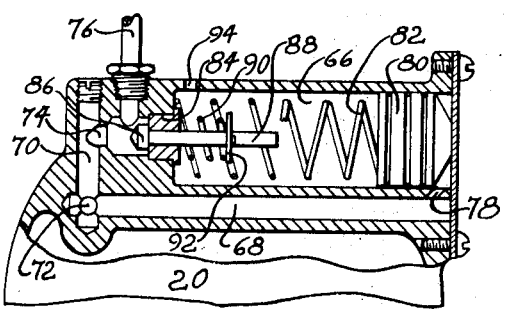
Fig. 3 is a modification showing another form of my device, parts being broken away and in section.
Figure 4:
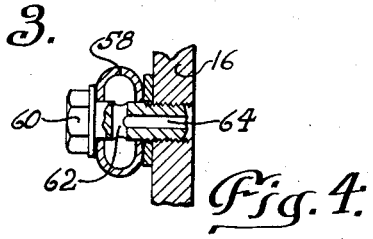
Fig. 4 is a sectional view taken on line 4—4 of Fig. 1.

Referring to Fig. 3 wherein a modified form of my invention has been illustrated, I have shown the pump 20 provided with a chamber 66, passage 68 and passage 70. The lubricant is supplied from the pump 20 through a passage 72 to both passages 68 and 70. The lubricant through the passage 70 is adapted to flow through opening 74 and passage 76 to the header 58. Another passage 78 forms a communication between the passage 68 and chamber 66. A piston 80 is adapted for reciprocation within the chamber 66 and a spring 82 normally holds the piston in a position as shown in the drawing. At the left of the chamber 66, I have provided a bushing 84 adapted to receive a valve 86 in axial alignment with the passage 74. The valve 86 has a stem 88 projecting into the chamber 66. A spring 90 between the bushing 84 and a collar 92 normally holds the valve away from its seat. As the lubricant is delivered through the passage 72 a portion thereof goes into the header 58 through passages 70 and 74 and 76 and another portion thereof goes through the passages 68 and 78 at one side of the piston 80. The pressure of this forced lubricant causes the piston 80 to move to the left, displacing any lubricant or air on the opposite side of the piston through a vent 94. As the piston engages the end of the stem 88 the valve 86 closes the passage 74 shutting off the supply of lubricant to the header 58 and the piston 80 remains in this position as long as the lubricant pressure is maintained, or the engine running. When the engine is stopped the spring 82 returns the piston 80 to the position shown on the drawing and the valve 86 is automatically opened for a supply of lubricant to be delivered to the header when the engine is again started.

It will be understood that I have provided a construction in which lubricant is supplied to the cylinder walls during the warming up period by a means operable by the oil pressure.

While I have shown the preferred embodiment of my invention it is to be understood that various changes in the size and arrangement of parts may be made without departing from the spirit of my invention. The piston may be replaced by other means such as a diaphragm for displacing the lubricant on one side by pressure on the opposite side. It is not my intention to limit the scope of my invention other than by the terms of the appended claims.

What I claim is:

1. In an internal combustion engine, the combination with an oil pan, an oil system including a pump in the lower portion of said oil pan, means for conducting lubricant to the parts of the engine to be lubricated, means for conducting lubricant to the cylinder walls of said engine, and means in said oil pan adjacent said pump for regulating the amount of lubricant conducted to said cylinder walls by the fluid pressure from said pump.

2. A device of the class described comprising a housing, a plurality of passages in said housing adapted to receive fluid pressure, a chamber within said housing, a communication between one of said passages and said chamber, a connection from another of said passages to a part to receive the fluid pressure, and valve means for shutting off the flow through said last named passage by the pressure in said first named passage.

3. A device of the class described comprising a housing, a chamber within said housing, a passage adapted to deliver a fluid pressure, a pair of passages communicating with said passage and adapted to receive the fluid pressure, a communication between one of said passages and said chamber at one end thereof, a valve at the opposite end of said chamber for closing the other of said passages, a reciprocating member within said chamber between said valve and said communication, a spring for urging said valve in its open position, and a spring for urging said piston away from said valve.

4. A device of the class described comprising a housing, a chamber within said housing, a passage adapted to deliver a fluid pressure, a pair of passages communicating with said passage and adapted to receive the fluid pressure, a communication between one of said passages and said chamber at one end thereof, a valve at the opposite end of said chamber for closing the other of said passages, a reciprocating member within said chamber between said valve and said communication, a spring for urging said valve in its open position, and a spring for urging said piston away from said valve.

5. In a lubricating system for internal combustion engines and the like, the combination with a cylinder, of a source of lubricant under pressure, of a pump, an auxiliary pump provided with a chamber having an inlet passage arranged in constant communication with the source of lubricant under pressure during operation of said first mentioned pump and having an outlet passage establishing communication with the interior of the said cylinder, and a piston reciprocably mounted in said chamber and operable by the lubricant under pressure for forcing lubricant through the outlet passage aforesaid upon the walls of said cylinder.

WALTER S. COCHRANE.